Patented June 29, 1943

2,323,054

UNITED STATES PATENT OFFICE 2,323,054

CONDENSATION OF AN IMIDE OF A DICARBOXYLIC ACID WITH A POLYAMINE

Hugo Kroeper, Heidelberg, Germany; vested in the Alien Property Custodian

No Drawing. Application January 22, 1940, Serial No. 315,038. In Germany January 11, 1939

3 Claims. (Cl. 260—2)

The present invention relates to a process for the production of condensation products.

I have found that valuable condensation products are obtained by causing imides of dicarboxylic acids to react at elevated temperature with amines containing in the molecule at least two primary or secondary amino groups. The reaction would have been expected to take place in analogy to the biuret reaction according to the following scheme:

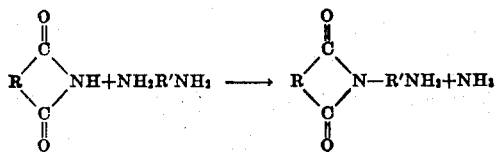

Instead, however, high-molecular condensation products are obtained which are likely to contain the following grouping

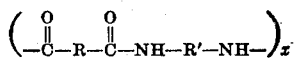

wherein $x$ is a whole number which becomes the greater the more the reaction proceeds.

Suitable imides are for example succinic acid imide, glutaric acid imide and adipic acid imide.

Among suitable amines there may be mentioned for example pentamethylenediamine, hexamethylenediamine, 1.4 - cyclohexyldiethylamine, p-phenylene-bis-ethylamine, triethylenetetramine, benzidine, aminoethylpiperazine, N.N' - diacetyl - dipropylamino - hexamethylenediamine

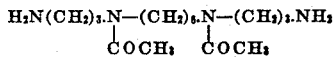

and thiodibutylamine

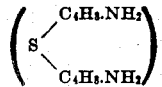

The reaction is carried out at elevated temperatures, which may range for example up to about 300° C., advantageously at temperatures of between 150° and 300° C., varying according to the type of the initial materials used and the nature of the products desired. By prolonged heating and employment of high temperatures high-molecular products are obtained. In many cases it is preferable to conduct the reaction in closed vessels, especially when the condensation is carried out at temperatures above the boiling point of one or both of the initial substances.

The quantities in which the initial substances are used may be varied within wide limits. Usually 1 molecular proportion of diamine is used to about 1 molecular proportion of imide or 2 molecular proportions of an amine having 3 primary or secondary amino groups are used to about 3 molecular proportions of imide, etc. By using one of the initial substance in excess, the length of the chain of the condensation products may be varied and more or less highly polymerized products obtained. In many cases it is useful to subject the polymerized products to a heat treatment in vacuo.

When a treatment with hydrating agents is carried out during or after the condensation polyamides are formed while ammonia or ammonium salts are split off. Among hydrating agents, for example, water may be mentioned which may be added as such or generated by a simultaneous reaction attended with the formation of water; thus carboxylic acids or alcohols may be heated together with the initial substances from which water is split off upon reaction with the amine used.

The following example serves to illustrate how the present invention may be carried out in practice, but the invention is not restricted to this example. The parts are by weight.

Example 113 parts of glutaric acid imide and 116 parts of hexamethylenediamine are heated to 180° C. under reflux cooling. A vigorous evolution of ammonia takes place. This having subsided, the temperature is raised to about 290° C. and the reaction mixture kept at this temperature for another 12 hours until the smell of ammonia has vanished. The condensation products obtained possess polyamide-like properties.

What I claim is:

1. The process for the production of condensation products which comprises heating a cyclic imide of a dicarboxylic acid with an amine containing in the molecule at least two amino groups each of which contains at least one hydrogen atom directly attached to the amino nitrogen the imide and amino groups being the only reactant groups in the respective compounds.

2. The process for the production of condensation products which comprises causing a cyclic imide of a dicarboxylic acid to react at a temperature between about 150° and about 300° C. with an amine containing in the molecule at least two amino groups each of which contains at least one hydrogen atom directly attached to the amino nitrogen the imide and amino groups being the only reactant groups in the respective compounds.

3. The process for the production of condensation products which comprises causing glutaric acid imide to react at a temperature between about 150° and about 300° C. with hexamethylene diamine.

HUGO KROEPER.